(No Model.)

W. F. WELLMAN.
ANTI-FRICTION BEARING.

No. 475,835. Patented May 31, 1892.

WITNESSES:
K. E. Brown,
A. D. Harrison

INVENTOR:
W. F. Wellman
by Wright Brown Quinby
Attys.

UNITED STATES PATENT OFFICE.

WILLARD F. WELLMAN, OF BELFAST, MAINE, ASSIGNOR TO FRANK C. PITCHER, OF MEDFORD, MASSACHUSETTS.

ANTI-FRICTION BEARING.

SPECIFICATION forming part of Letters Patent No. 475,835, dated May 31, 1892.

Application filed June 25, 1891. Renewed March 12, 1892. Serial No. 424,632. (No model.)

*To all whom it may concern:*

Be it known that I, WILLARD F. WELLMAN, of Belfast, in the county of Waldo and State of Maine, have invented certain new and useful Improvements in Anti-Friction Bearings, of which the following is a specification.

This invention relates to anti-friction bearings for journals, and particularly for the journals of railway-car axles, although the invention hereinafter described is not limited to car-axle journals; but may be used for any purpose to which it is adapted.

The invention has for its object to provide a simple and effective anti-friction bearing, the parts or members of which are adapted to exclude dust from the surfaces of the journal and its anti-friction supports and to be readily taken apart and put together.

The invention also has for its object to provide an anti-friction bearing including a box or casing and a series of anti-friction rollers supported by said box around the journal, the whole being of such construction that the anti-friction rollers cannot be caused by an independent longitudinal movement of the journal or of the box to bind on either end of the box to such an extent as to interfere with the free rotation of the rolls.

To these ends the invention consists in the improvements which I will now proceed to describe and claim.

Figure 1:
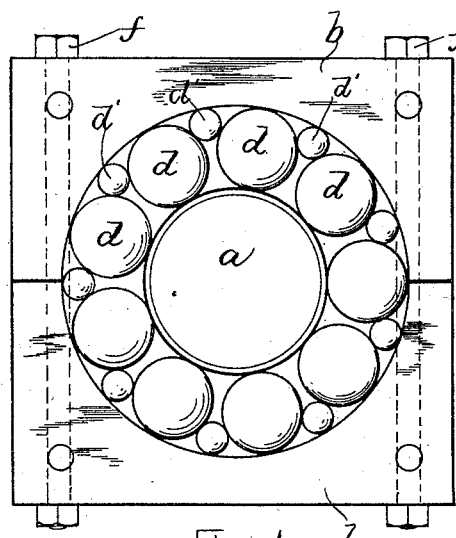
Figure 2:
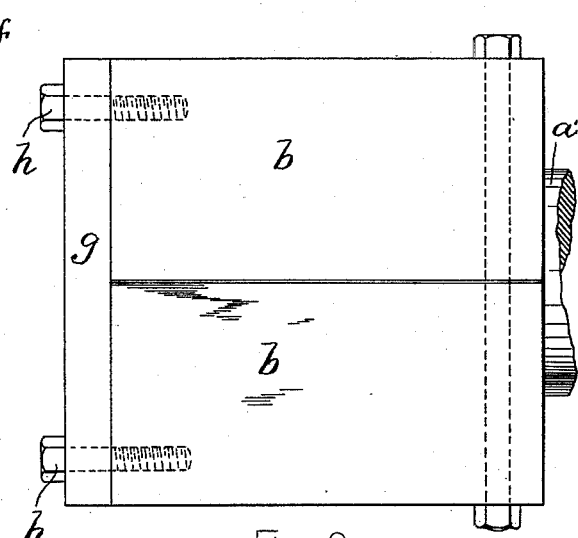
Figure 3:
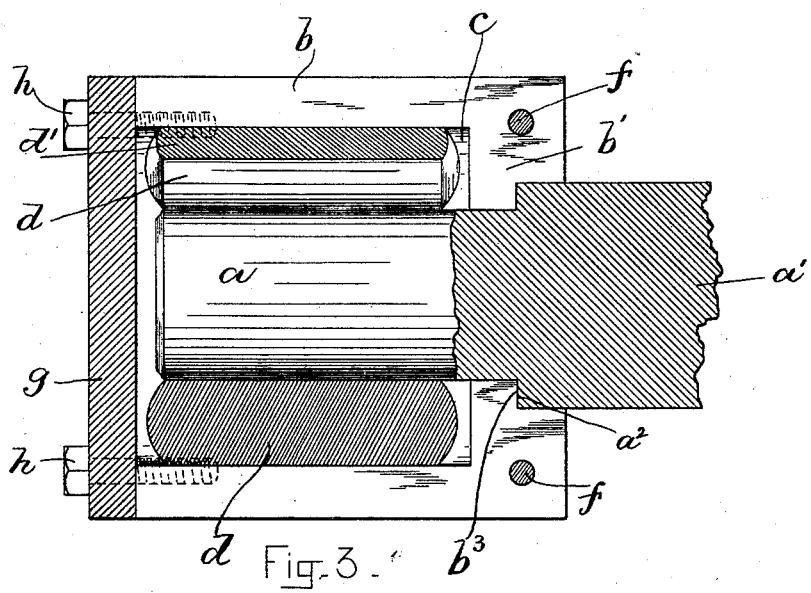
Figure 4:
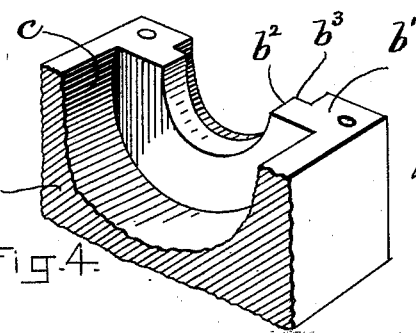

In the accompanying drawings, forming a part of this specification, Figure 1 represents an end elevation of my improved anti-friction bearing, the cap at the outer end thereof being removed to expose the interior. Fig. 2 represents a side elevation of the box or casing, the end cap being in place. Fig. 3 represents a longitudinal section on line 3 3, Fig. 1, showing the end cap in place. Fig. 4 represents a perspective view of a portion of one of the sections of the box.

The same letters of reference indicate the same parts in all the figures.

In the drawings, $a$ represents the journal, which is in this instance formed on a car-axle $a'$. The journal is provided with an enlargement or shoulder at $a^2$ for a purpose which will presently appear. The box or casing which receives the journal is composed of two sections $b\ b$, each constituting one-half of the body of the box. Each section has a semicircular cavity $c$, the two cavities forming, when the sections are assembled, a circular chamber or cavity, which surrounds the journal $a$ and forms an annular space around said journal for the reception of the anti-friction rollers $d\ d$. Each section $b$ has at its inner end a wall or flange $b'$, which has a semicircular recess $b^2$, formed with a shoulder $b^3$, which fits the shoulder $a^2$ on the journal $a$, the recesses $b^2$ of the two sections closely fitting the journal at both sides of the shoulder $a^2$. The shoulder $a^2$ on the journal and the shoulders $b^3$ on the sections of the box increase the area of bearing-surface of the inner end of the box on the journal and thus make a tight joint, which will prevent dust from entering the interior of the box around the journal. The sections $b\ b$ are connected by bolts $f f$, passing through the sections, said bolts being detachable, so that the sections can be readily separated and assembled.

$g$ represents a cap attached by bolts $h\ h$ to the outer ends of the sections $b\ b$, said cap covering the outer end of the cavity of the box. The anti-friction rollers $d\ d$ are of such diameter that each extends across the annular space and bears simultaneously on the journal $a$ and on the wall of the cavity $c$. Said rollers are kept separated from each other and held at a uniform distance apart by means of smaller intermediate rollers $d'$, arranged as shown in Fig. 1, each roller $d'$ bearing on the wall of the cavity $c$ and on two of the rollers $d$. The intermediate rollers $d'$ constitute frictionless separating devices, which keep the rollers $d$ from rubbing against each other, as will be readily seen. The rollers $d$ and $d'$ are shorter than the length of the cavity $c$, as shown in Fig. 3, so that the ends of said rollers are not liable to bear with any considerable friction or pressure upon the ends of said cavity. The ends of the rollers $d$ and $d'$ are preferably rounded or of convex form, as shown in Fig. 3, so that if either roller by reason of endwise displacement comes in contact with an end casing it will have only a limited area of bearing on said end, so that the friction caused by said bearing will be reduced to the minimum. The journal $a$ is of uniform diameter from the shoulder $a^2$ to the extreme outer end of the journal, the flange or enlargement at the outer end of the journal, which is common in car-axle journals, being omitted. The length of the journal $a$ is such that when its shoulder $a^2$ bears against the shoulder $b^3$ of the box the outer end of the journal is separated from the cap $g$ at the outer end of the box, as shown in Fig. 3. This arrangement prevents the outer end of the journal from being brought into contact with the cap $g$ by any independent endwise movement of either the box or the journal. Hence there is no liability of breaking or injuring the cap $g$ by such contact. It will be understood that the box is affixed to the car-truck in the usual or any suitable way.

In the running of railroad-trains there is usually a tendency of either the boxes or the axle to move endwise independently to a limited extent. It will be observed that whenever this tendency exists the form of the journal $a$, the same being made without a flange or enlargement at its outer end, as already described, will enable it to move independently without imparting a similar movement to the rollers $d$. Hence there is no liability of a forcible pressure of the ends of the rollers against the inner end of the roller-containing cavity in the box, as there would be if the journal were provided at its outer end with the usual flange or enlargement.

The sectional construction of the box above described enables it to be readily applied to and removed from the journal and also facilitates its manufacture by casting, while the movable cap or cover $g$ at the outer end of the box permits access to the cavity of the box for the purpose of inspecting or removing and replacing the rollers $d\ d'$. It will be seen that the rollers $d\ d'$ are freely interchangeable and removable, there being no positive engagement of the rollers with the box, so that each is free to be withdrawn when the cap $g$ is removed.

I claim—

1. In an anti-friction bearing, the combination, substantially as hereinbefore set forth, of the following elements, viz: first, a journal having a shoulder $a^2$; secondly, a box composed of separable sections $b\ b$, each having a semicircular cavity terminating in an end wall having a semicircular recess, and a cap or plate $g$, attached to the outer ends of said sections, said cavities forming a circular roller-holding chamber surrounding the outer portion of the journal, while the end walls bear against the shoulder $a^2$, thus sustaining the end-thrust of the journal, the journal being shorter than the chamber, so that its outer end cannot bear on the cap $g$, and, thirdly, a series of loose anti-friction rollers $d$ and smaller loose anti-friction rollers $d'$, inserted in said chamber, said rollers being freely movable endwise and having reduced ends, whereby the area of their bearing on the ends of the chamber is reduced to the minimum.

2. As an improvement in anti-friction bearings, a box composed of two separably-connected sections $b\ b$, each having a semicircular cavity $c$, and an end wall $b'$, having a shouldered recess $b^2$, and a cap $g$, attached to the outer ends of the sections, said cavities $c$ forming a circular chamber while the recesses in the end wall constitute a shouldered orifice, combined with a journal having a shoulder formed to fit said shouldered orifice and abut against the shoulder therein, said journal being of uniform diameter from its shoulder to its outer end, and a series of anti-friction rollers $d$ and smaller intermediate rollers $d'$, located in the annular space surrounding the journal, said rollers being shorter than the cavity or chamber which contains them, as set forth.

In testimony whereof I have signed my name to this specification, in the presence of two subscribing witnesses, this 23d day of June, A. D. 1891.

WILLARD F. WELLMAN.

Witnesses:
FRANK C. PITCHER,
C. F. BROWN.